US012776865B2

(12) United States Patent
Yao et al.

(10) Patent No.: US 12,776,865 B2
(45) Date of Patent: Oct. 27, 2026

(54) AGGREGATED RETRANSMISSION SCHEMES

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Huaning Niu, San Jose, CA (US); Oghenekome Oteri, San Diego, CA (US); Sarma V. Vangala, Campbell, CA (US); Sigen Ye, San Diego, CA (US); Wei Zeng, Saratoga, CA (US); Weidong Yang, San Diego, CA (US); Yushu Zhang, Beijing (CA); Zhu Ji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 18/249,309

(22) PCT Filed: Oct. 23, 2020

(86) PCT No.: PCT/CN2020/123368
§ 371 (c)(1),
(2) Date: Apr. 17, 2023

(87) PCT Pub. No.: WO2022/082762
PCT Pub. Date: Apr. 28, 2022

(65) Prior Publication Data

US 2024/0031075 A1 Jan. 25, 2024

(51) Int. Cl.

*H04L 1/1812* (2023.01)
*H04L 1/1829* (2023.01)
*H04L 1/1867* (2023.01)

(52) U.S. Cl.
CPC .......... *H04L 1/1819* (2013.01); *H04L 1/1854* (2013.01); *H04L 1/1887* (2013.01)

(58) Field of Classification Search
CPC ... H04L 1/1819; H04L 1/1854; H04L 1/1887; H04L 1/1822; H04L 1/1864; H04L 1/189; H04L 1/1896
See application file for complete search history.

(56) References Cited

U.S. PATENT DOCUMENTS

2016/0218788 A1* 7/2016 Yum .................... H04B 7/0626
2019/0103946 A1 4/2019 Li et al.
(Continued)

FOREIGN PATENT DOCUMENTS

CN 109804591 A 5/2019
CN 110324904 A 10/2019
(Continued)

OTHER PUBLICATIONS

Thales; "Solutions for NR to support non-terrestrial networks (NTN)"; 3GPP TSG RAN meeting #88e; RP-201256, revision from RP-200600 & 193234 Jun. 29, 2020.
(Continued)

*Primary Examiner* — Yaotang Wang
(74) *Attorney, Agent, or Firm* — Eschweiler & Potashnik, LLC; Matthew Glause

(57) ABSTRACT

Systems, methods, and circuitries are provided for supporting aggregated retransmissions. In one example, a method includes receiving control information that indicates resources including one or more slots for communication of a physical downlink shared channel (PDSCH) or a physical uplink shared channel (PUSCH) transmission that includes at least one PDSCH/PUSCH retransmission A slot group to which a selected one of the one or more slots belongs is identified. The method includes configuring operation to
(Continued)

receive the PDSCH transmission or to transmit the PUSCH transmission based on the resources. In response to determining that a PDSCH/PUSCH retransmission of the PDSCH/PUSCH transmission is scheduled for a slot outside the identified slot group, operation is configured to provide hybrid automatic repetition request (HARQ) feedback based on PDSCH/PUSCH retransmissions scheduled for slots within the identified slot group, wherein the HARQ feedback is not based on PDSCH/PUSCH scheduled for slots outside the identified slot group.

10 Claims, 8 Drawing Sheets

(56) References Cited

U.S. PATENT DOCUMENTS

| | | | | |
|---|---|---|---|---|
| 2019/0306856 | A1 | 10/2019 | Ji et al. | |
| 2020/0014495 | A1 | 1/2020 | Niu et al. | |
| 2021/0329627 | A1 | 10/2021 | Baldemair | |
| 2022/0052779 | A1* | 2/2022 | Ye | H04W 72/23 |
| 2023/0319822 | A1* | 10/2023 | Park | H04L 1/0003<br>370/329 |
| 2024/0259163 | A1* | 8/2024 | Singh | H04L 1/1861 |

FOREIGN PATENT DOCUMENTS

| | | | |
|---|---|---|---|
| CN | 110419257 | A | 11/2019 |
| CN | 111226406 | A | 6/2020 |
| CN | 111279643 | A | 6/2020 |
| CN | 111385080 | A | 7/2020 |
| EP | 3621233 | A1 | 3/2020 |
| EP | 3697013 | A1 | 8/2020 |
| WO | 2018203722 | A | 5/2018 |
| WO | 2020065617 | A1 | 4/2020 |

OTHER PUBLICATIONS

Search Report mailed May 31, 2021 in connection with Application No. PCT/CN2020/123368.

Written Opinion mailed May 31, 2021 in connection with Application No. PCT/CN2020/123368.

3rd Generation Partnership Project; Technical Specification Group Radio Access Network; NR; Physical layer procedures for control; (Release 16); 3GPP TS 38.213 V16.3.0 (Sep. 2020); http://www.3gpp.org.

3rd Generation Partnership Project; Technical Specification Group Radio Access Network; NR; Radio Resource Control (RRC) protocol specification; (Release 16); 3GPP TS 38.331 V16.2.0 (Sep. 2020); http://www.3gpp.org.

European Extended Search Report mailed Apr. 22, 2024 in connection to U.S. Appl. No. 20/958,344.

International Preliminary Report on Patentability dated Apr. 13, 2023 in connection with PCT Application No. PCT/CN2020/123368.

Chinese Notice of Grant dated Jun. 16, 2025 in connection with Application No. 2020801065859.

* cited by examiner

Slot Group 1 HARQ Process Number 0-7
Slot Group 2 HARQ Process Number 8-15
Slot Group 3 HARQ Process Number 16-23
Slot Group 4 HARQ Process Number 24-31

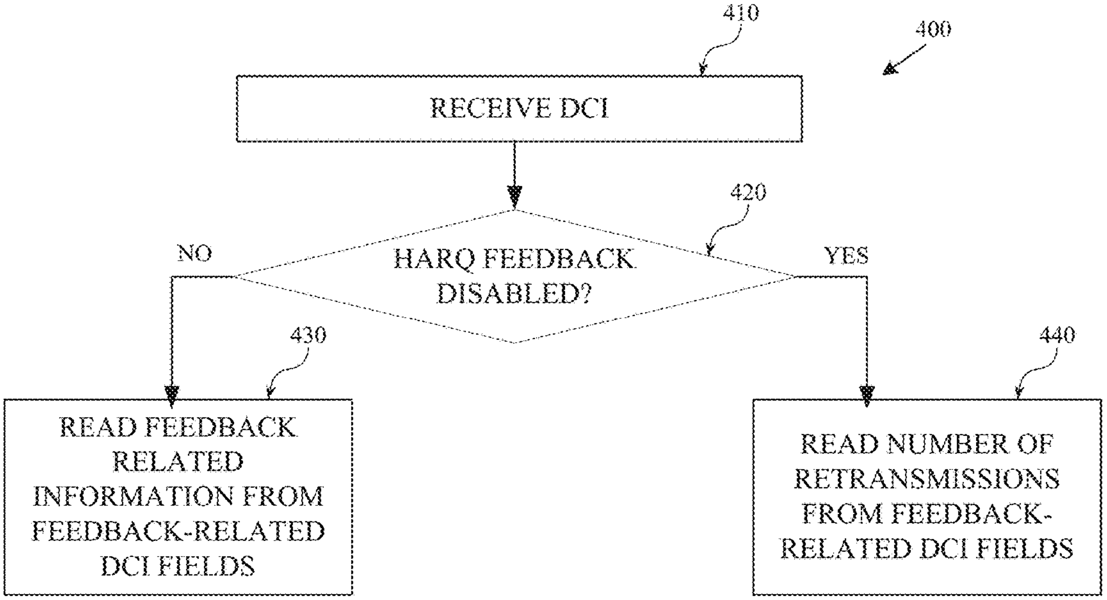
*FIG. 4*
| TDRA Index | K0 | Mapping Type | Start Symbol | Repetition No. | RV Sequence |
|---|---|---|---|---|---|
| 0 | | | | 4 | [0 2 3 1] |
| 1 | | | | 4 | [0 3 0 3] |
| 2 | | | | | |
| 3 | | | | | |
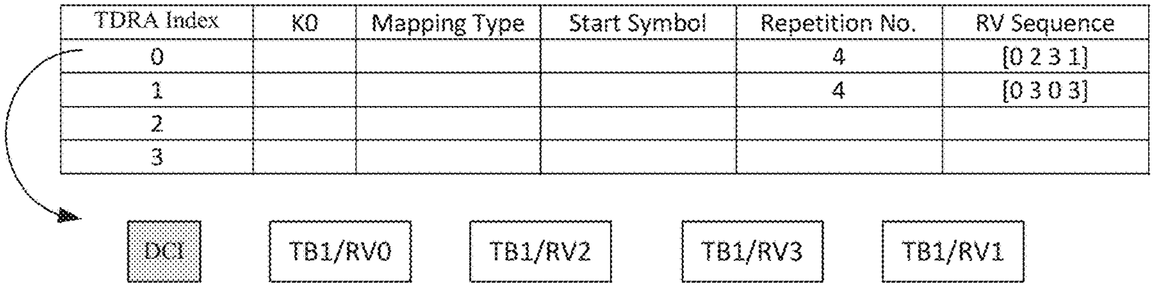
*FIG. 5A*
| RV Sequence Index | RV Sequence |
|---|---|
| 0 | [0 2 3 1] |
| 1 | [0 3 0 3] |
| 2 | [0 0 0 0] |
| 3 | |
*FIG. 5B*

| TDRA Index | K0 | Mapping Type | Start Symbol | Repetition No. | Time Gap (slots) |
|---|---|---|---|---|---|
| 0 | | | | 4 | [2 3 1] |
| 1 | | | | 4 | [3 1 3] |
| 2 | | | | | |
| 3 | | | | | |

| TDRA Index | K0 | Mapping Type | Start Symbol | Time Gap (slots) |
|---|---|---|---|---|
| 0 | | | | [2 3 1] |
| 1 | | | | [3 1 3] |
| 2 | | | | |
| 3 | | | | |

AGGREGATED RETRANSMISSION SCHEMES

This application is a National Phase entry application of International Patent Application No. PCT/CN2020/123368 filed Oct. 23 2020, entitled "AGGREGATED RETRANSMISSION SCHEMES", the contents of which are herein incorporated by reference in their entirety.

BACKGROUND

Some wireless communication networks, such as non-terrestrial networks may be susceptible to high-latency links, which complicates many aspects of communication.

BRIEF DESCRIPTION OF THE DRAWINGS

Some examples of circuits, apparatuses and/or methods will be described in the following by way of example only. In this context, reference will be made to the accompanying figures.

FIG. 4 is a flow diagram illustrating a method for determining a repetition number from control information, in accordance with various aspects disclosed.

FIG. 5A illustrates an exemplary time domain resource allocation table that indicates redundancy version sequence, in accordance with various aspects disclosed.

FIG. 5B illustrates an exemplary redundancy version sequence table that indicates redundancy version sequences mapped to redundancy version sequence indexes, in accordance with various aspects disclosed.

DETAILED DESCRIPTION

Figure 1A:
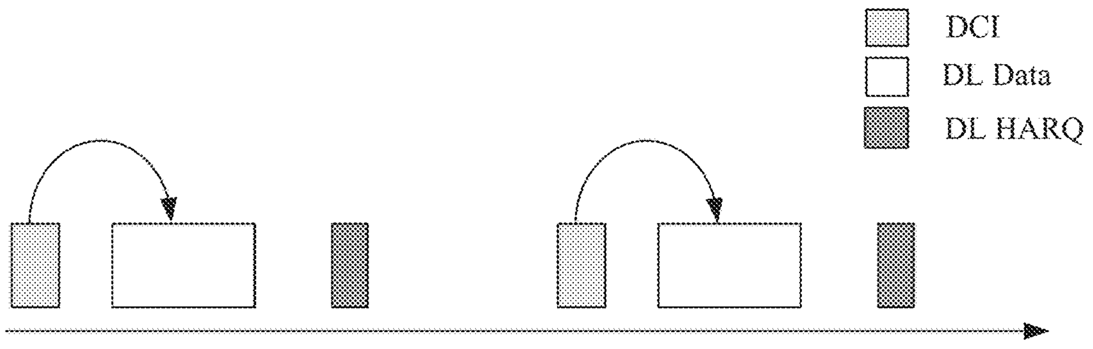
FIGS. 1A-1D are block diagrams outlining four different types of retransmission schemes.

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

As the number of mobile devices connected to wireless networks and the demand for mobile data traffic continue to increase, changes are made to system requirements and architectures to meet current and anticipated burgeoning demand. For example, wireless communication networks such as the 5G new radio (NR) systems may need to be deployed using satellites as parts of a non-terrestrial network (NTN). In one deployment scenario of a NTN, a satellite referred to as a transparent satellite may act as a relay station to link user devices with a ground-based base station and the 5G core network by implementing a transparent payload. In another deployment scenario, a satellite referred to as a regenerative satellite may have onboard processing capability to perform the functions of a base station by implementing a regenerative payload between the user devices and the ground-based 5G core network.

Due to the wide coverage area of the satellites and the long distances between the satellites and the user devices on the ground, the difference in propagation delays between two user devices within the beam footprint is greater than that encountered in strictly terrestrial networks. For example, for a NTN deploying satellites in a geosynchronous earth orbit (GEO), the maximum differential delay between points at a nadir and edge of the coverage may be 10.3 ms. For a NTN deploying satellites in a low earth orbit (LEO), the maximum differential delay may be 3.12 ms and 3.18 ms for 600 km and 900 km altitude, respectively.

The large propagation delay of a user device and the large difference in propagation delays between user devices in the beam footprint may cause problems with the use of hybrid automatic repeat request (HARQ) feedback. To cope with the larger propagation delays, it may be advantageous for user equipment (UE) devices to support an increased number of HARQ processes. However, this increased number of HARQ processes introduces design challenges around communicating HARQ process identifiers and storage/processing capabilities of UE devices. The potential loss in link reliability due to long distances and moving base stations may be compensated by performing proactive aggregated retransmission or blind retransmission. Further, in many circumstances it may be beneficial to simply disable HARQ feedback, meaning that the use of compensating techniques such as aggregated or blind retransmission may become more prevalent.

Disclosed herein are systems, circuitries, and techniques for supporting the signalling and performance of retransmission techniques in the presence of high-latency links or large propagation links when HARQ feedback may be disabled.

As used herein "retransmission" refers to retransmitting a same physical downlink shared channel (PDSCH) or physical uplink shared channel (PUSCH) data (and associated error coding bits) (or a redundancy version of the same transport block) at least one additional time after the initial transmission of the transport block. This retransmission may be proactive, meaning that the retransmission may be performed independent of any received HARQ feedback. Retransmission, as compared to a new transmission of data, may be indicated, for example, by a same HARQ process number or a new data indicator (NDI) bit being un-toggled. In some examples, the retransmissions are combined by the receiving device according to a soft decoding scheme.

In some examples, the number of times a PDSCH/PUSCH is to be proactively retransmitted is referred to as a repetition number, which may be indicated by uplink (UL) or downlink (DL) downlink control information (DCI), which is referred to in a generic sense herein as "control information." In some examples, other signalling methods than DCI may be used in place of DCI to communicate the described control information. The terms "retransmission" and "repetition" may be used interchangeably in this description. Unless otherwise noted, it is to be assumed that example downlink communication for techniques can also be applied in uplink communication.

Figure 1B:
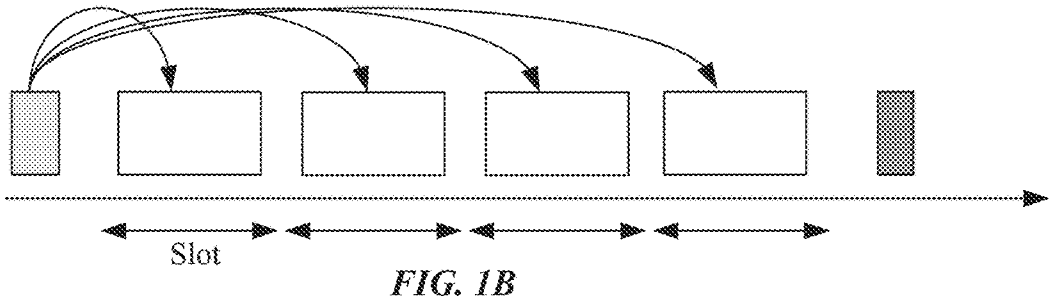

FIGS. 1A-1D illustrate several different retransmission schemes. FIG. 1A illustrates legacy retransmission. It can be see that each transmission of DL data (including each retransmission of the DL data) is indicated by a corresponding and separately acknowledged by DL HARQ feedback. FIG. 1B illustrates legacy aggregated retransmission with HARQ feedback. A single DCI is used to schedule transmission and several retransmissions of the same DL data. A single HARQ feedback communication (e.g., bit) is used to acknowledge (ACK) or not acknowledge (NACK) successful receipt of the DL data. The retransmissions occur in contiguous slots using the same frequency resources. In some examples, the slots are arranged into slot groups of contiguous slots, with each slot group being associated with a set of HARQ process numbers.

Figure 1C:
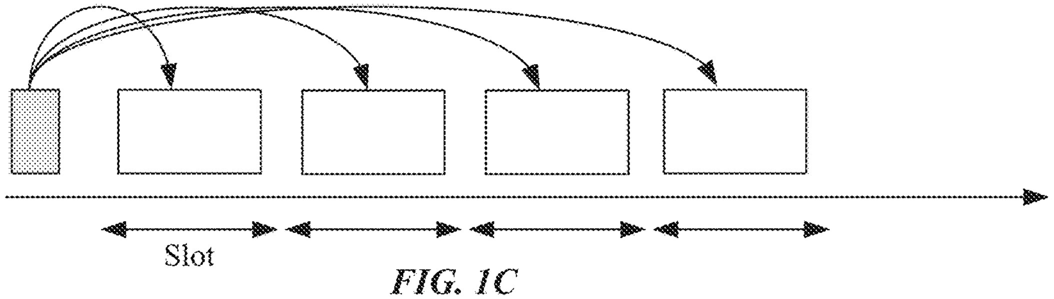
Figure 1D:
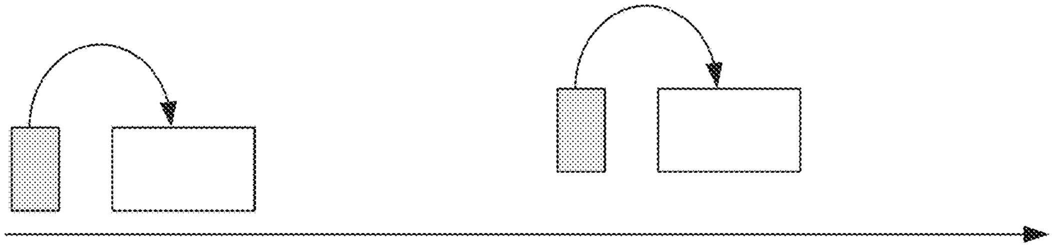

In some high latency situations, HARQ feedback may be disabled. FIG. 1C illustrates aggregated retransmission without HARQ feedback. A single DCI is used to schedule transmission and several retransmissions of the same DL data. Another type of retransmission scheme that may be beneficial when HARQ feedback is disabled is blind retransmission, which is illustrated in FIG. 1D. Each blind retransmission is signaled by its own DCI, meaning that blind retransmission may be proactive retransmission of the same PDSCH/PUSCH on resources that are unrelated to prior transmissions. The blind retransmission approach thus provides the advantage of time and/or frequency diversity over the aggregated retransmission techniques illustrated in FIGS. 1B and 1C, in which the same frequency resources and consecutive slots are used for retransmission.

Figure 2A:
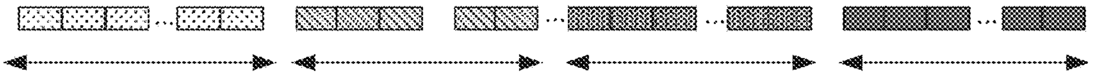
FIGS. 2A-2B are block diagrams illustrating two exemplary different slot grouping schemes, in accordance with various aspects disclosed.
Figure 2B:
Figure 3A:
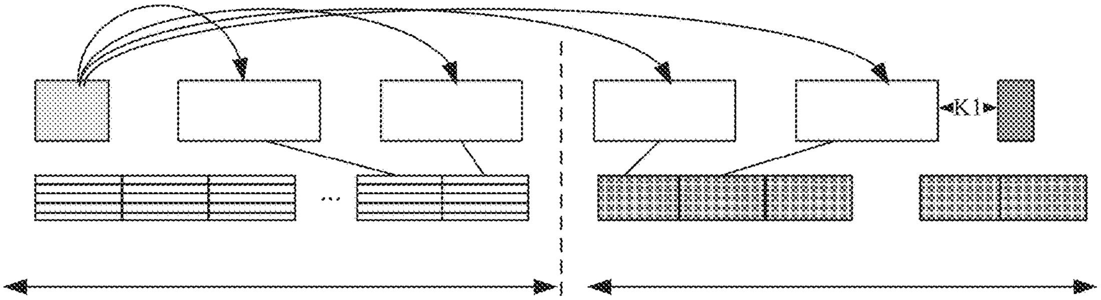
FIG. 3A is a block diagram illustrating an exemplary PDSCH that spans slot groups, in accordance with various aspects disclosed.
Figure 3B:
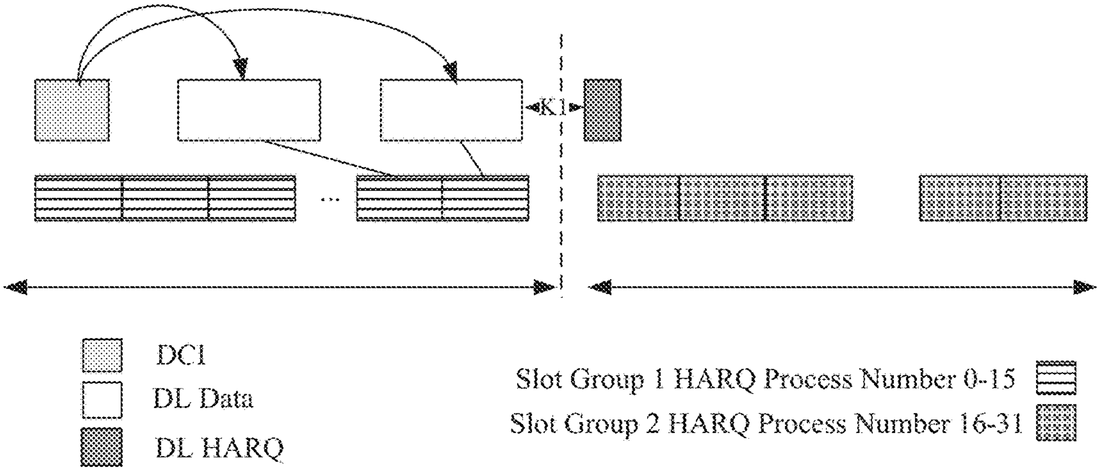
FIG. 3B is a block diagram illustrating an exemplary technique for receiving/transmitting the PDSCH of FIG. 3A, in accordance with various aspects disclosed.

FIGS. 2A and 2B illustrate two exemplary ways that slots may be arranged into slot groups. Each slot group is associated with a range of HARQ process numbers. In the example illustrated in FIG. 2A, the slots in a slot group are consecutive. In the example illustrated in FIG. 2B, the slots in each slot group are interleaved with slots in other slot groups. FIG. 3A illustrates a potential ambiguity that arises when one or more retransmissions of an aggregated retransmission will occur in a different slot group. For example, the slot group may be determined based on a slot in which the initial DL data (PDSCH) occurs or, alternatively, the slot in which the physical downlink control channel (PDCCH) or DCI occurs. In either case the illustrated aggregated retransmission belongs in slot group 1. This means that the HARQ process number for the aggregated retransmission is in the range of 0-15. The second two retransmissions of the PDSCH will occur in slots associated with slot group 2, which is associated with HARQ process groups 16-31. This raises a question as to how to combine PDSCH or PUSCH and handle HARQ feedback for the aggregated retransmission. FIG. 3B illustrates one possible solution in which the UE applies HARQ feedback after the last retransmission that occurs within the slot group (or before the slot boundary shown in dashed line). The HARQ feedback indicating ACK/NACK after receiving and decoding (and possibly combining) the two retransmissions occurring within the first slot group is provided in the appropriate slot (e.g., after expiration of K1, which is a configurable feedback timing parameter).

Figure 3C:
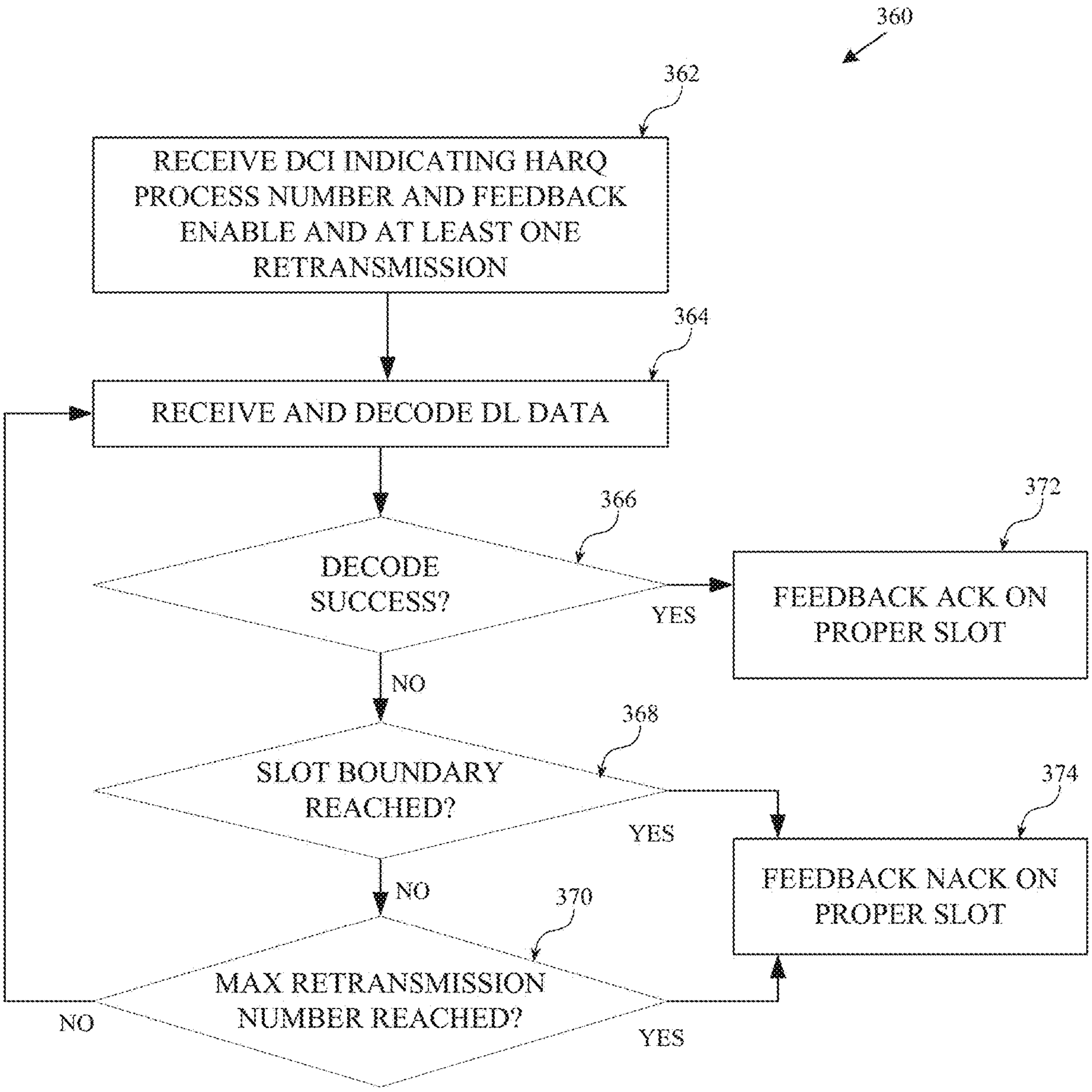
FIG. 3C is a flow diagram of an exemplary method for processing a PDSCH/PUSCH that spans slot groups, in accordance with various aspects disclosed.

FIG. 3C is a flow diagram outlining an example method 360 for performing HARQ feedback for an aggregated retransmission that may span more than one slot group. At 362 a downlink grant is received that indicates a HARQ process number with HARQ feedback enabled and also at least one retransmission (e.g., indicates a repetition number >0). At 364, DL data is received and decoded, with possible soft combining of previous retransmissions. At 366, a determination is made as to whether the decoding was successful. If so, at 372 ACK feedback is provided on a proper slot. If not, at 368 a determination is made as to whether a slot boundary between slot groups has been reached. If so, at 374 NACK feedback is provided on a proper slot. If not, at 370, a determination is made as to whether a maximum number of retransmissions (e.g., based on repetition number) has been reached. If so, at 374 NACK feedback is provided on a proper slot. If not, the method returns to 364 and a next retransmission is received and decoded.

Figure 3D:
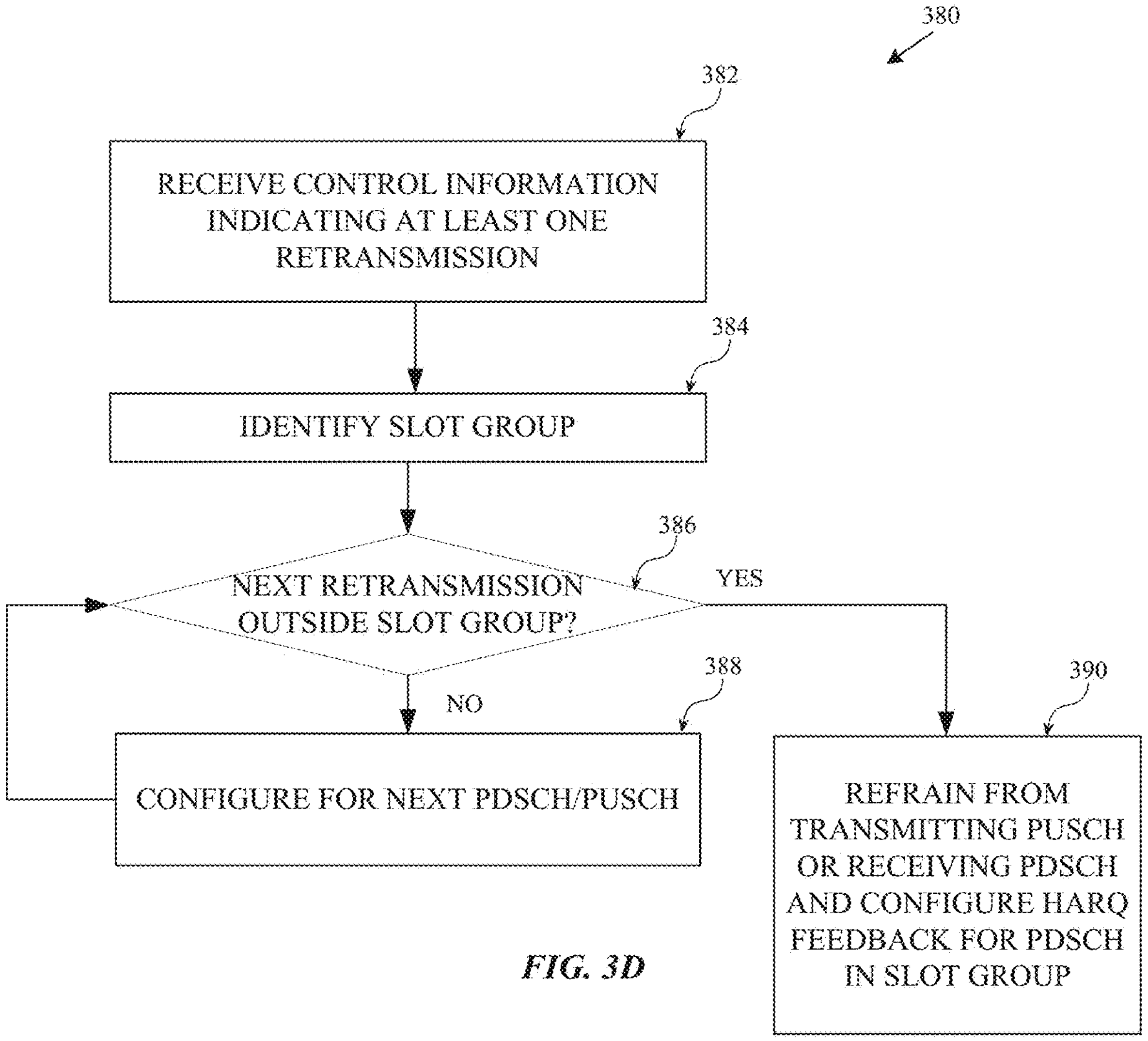
FIG. 3D is a flow diagram of an exemplary method for processing a PDSCH/PUSCH that spans slot groups, in accordance with various aspects disclosed.

FIG. 3D is a flow diagram outlining an exemplary method 380 that may be performed by a UE device for processing an aggregated retransmission that may span more than one slot group. At 382, control information is received that indicates resources including one or more slots for communication of a PDSCH/PUSCH transmission that includes at least one retransmission. At 384 a slot group is identified based on one of the one or more slots (e.g., and index of a first PDSCH/PUSCH slot or the PDCCH slot). At 386, a determination is made depending on whether a next retransmission is scheduled to occur in a slot outside the identified slot group. If not, at 388, operation is configured for receiving/transmitting the next PDSCH/PUSCH retransmission. If the next retransmission is scheduled to occur in a slot outside the identified slot group then at 390 the hybrid automatic repetition request (HARQ), the UE device refrains from transmitting the PUSCH or receiving the PDSCH and HARQ feedback is configured based on PDSCH retransmissions scheduled for slots within the identified slot group. Thus, the HARQ feedback is not based on PDSCH scheduled for slots outside the identified slot group. An analogous method for a base station is not described herein for the sake of brevity.

In some situations, it may be advantageous to have the ability to dynamically indicate a number of retransmissions, e.g., on a per DCI basis. This would allow the number of retransmissions to be dynamically adjusted based on, for example, quality of service (e.g., latency and reliability) requirements associated with different data or changing network conditions. However, the number of bits available in a DCI is limited and it is not desirable to increase a number of bits in DCI for compatibility and signaling overhead reasons.

FIG. 4 is a flow diagram outlining an exemplary method 400 of communicating a number of retransmissions (e.g., repetition number) by re-interpreting control information fields that usually carry HARQ feedback related information (e.g., redundancy version sequence or NDI) to determine a number of retransmissions. At 410, DCI is received. At 420, a determination is made as to whether HARQ feedback is disabled. If not, at 430 the DCI feedback-related fields are read to determine feedback related information.

However, if HARQ feedback is disabled, at 440 the DCI feedback-related fields are read to determine a number of retransmissions. In this manner, DCI bits are conserved by re-using feedback-related bits to encode a repetition number when feedback is not enabled. The DCI bits that carry the repetition number may indicate an repetition index value that is mapped, by prior signaling, to a number that cannot be represented by the number of available DCI bits.

FIGS. 5A and 5B illustrate two different exemplary techniques for dynamically signalling a redundancy version sequence in the uplink or downlink DCI. In FIG. 5A, a PDSCH time domain resource allocation (TDRA) table is modified to include a column for redundancy version (RV) sequence. The DCI can indicate a particular RV sequence by indicating a TDRA index. Thus a TDRA index of 0 as signaled in DCI would result in an RV sequence of [0 2 3 1], as illustrated in FIG. 5A. A similar modification may be made to a PUSCH TDRA table. A PUSCH TDRA table is not shown, but would include a column for K2 instead of K0. FIG. 5B illustrates an alternative technique in which the RV sequence is separately configured and the DCI indicates a configured RV sequence.

Figure 6:
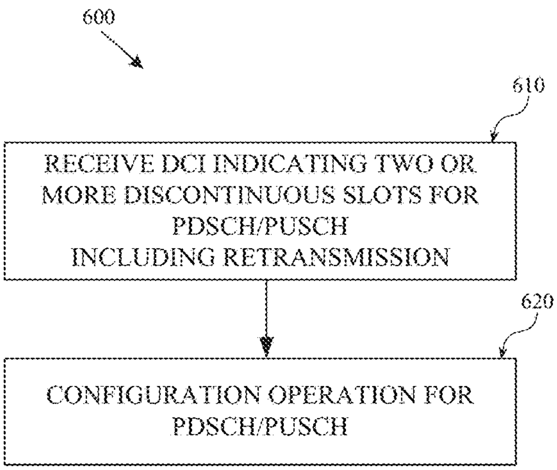
FIG. 6 is a flow diagram illustrating an exemplary method for configuring operation for retransmission on discontinuous slots, in accordance with various aspects disclosed.

Introducing time diversity into retransmission may improve the likelihood of successful decoding. FIG. 6 is a flow diagram outlining an exemplary method 600 for configuring operation for retransmissions in discontinuous slots. The method includes, at 610, receiving DCI indicating two or more discontinuous slots for PDSCH/PUSCH including at least one retransmission. At 620, operation for receiving/transmitting the PDSCH/PUSCH is configured.

Figure 7:
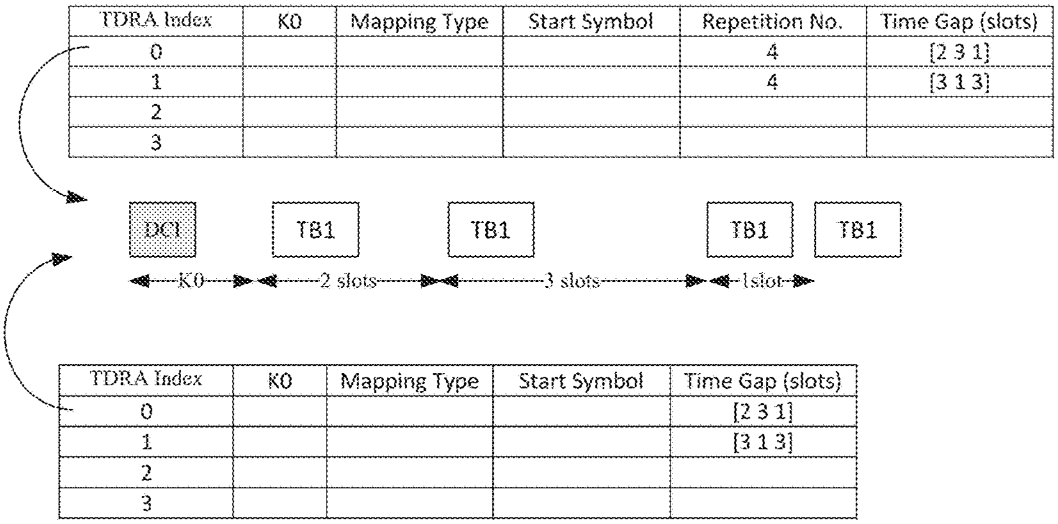
FIG. 7 illustrates two different exemplary time domain resource allocation tables that support retransmission on discontinuous slots, in accordance with various aspects disclosed.

FIG. 7 illustrates two different PDSCH TDRA tables that have been modified to allow indication of retransmissions in discontinuous slots. A similar modification may be made to a PUSCH TDRA table. A PUSCH TDRA table is not shown, but would include a column for K2 instead of K0. In both tables, a column for indicating time gaps (e.g., in terms of slots) between corresponding pairs of consecutive retransmissions is provided. For example, a time gap sequence of [2 3 1] configured by DCI indication of TDRA index (row) 0 results in the illustrated sequence of retransmissions. A gap of two slots occurs between the first pair of consecutive PDSCH/PUSCH transmissions. A gap of three slots occurs between the second pair of PDSCH/PUSCH transmissions. A gap of one slot occurs between the third pair of PDSCH/PUSCH transmissions.

In the second TDRA, the column for repetition number has been removed and the repetition number is implied by the number of time gaps indicated in the time gap sequence. In another alternative (not shown), the time gap could specify a fixed time gap and the repetition column could be maintained to allow for dynamic indication of retransmissions on non-contiguous slots in a regular pattern.

As discussed above, the increased latency of some networks may mean that up to 32 or more HARQ processes may be used. This may impact the performance of some UE devices that have limited storage medium for use as HARQ buffers. Limited buffer rate matching (LBRM) is a technique in which a reduced number of redundant coded bits (as compared to non-LBRM operation) is communicated in each retransmission. While this may degrade the likelihood of successful decoding to a certain extent, LBRM operation means that fewer bits are stored per retransmission, conserving HARQ buffer space. In some examples, when communication is being performed in LBRM mode, a predetermined portion of bits (e.g., ⅔) is communicated.

Figure 8:
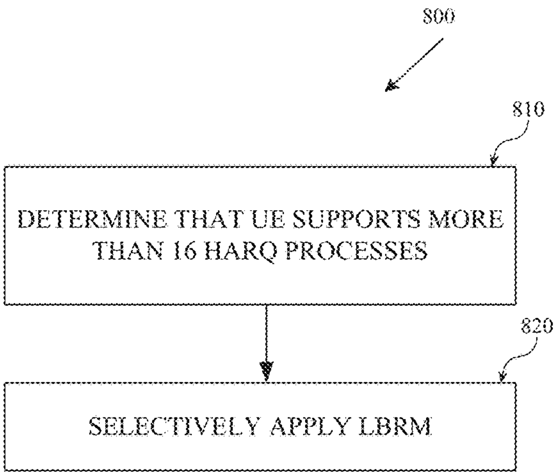
FIG. 8 is a flow diagram illustrating an exemplary method for applying limited buffer rate matching based on a number of supported hybrid automatic repeat request processes supported by a device, in accordance with various aspects disclosed.

When a significantly larger number of HARQ processes is supported by a UE, it may be advantageous to selectively employ LBRM. FIG. 8 illustrates a method 800 in which at 810 it is determined that a UE supports more than 16 HARQ processes and at 820 LBRM is selectively applied. In one example, when a UE supports more than 16 HARQ processes, LBRM is automatically (e.g., no separate configuration needed) applied. In one example, a separate configuration determines whether to apply LBRM for a given UE when the UE supports more than 16 HARQ processes. In one example, a UE device may indicate to a base station which of these two schemes the UE uses, depending on UE device capability. In one example, a number of coded bits to be communicated during LBRM operation is configurable, possibly depending on UE device capability. For example, ⅘ of the coded bits may be communicated.

Any of the above described methodologies for utilizing aggregated retransmission are well suited for use in NTN. For example, signals encoding DCI and PDSCH generated by a base station (either earthbound or on board a regenerative satellite) may be transmitted by a satellite to a UE device. Further, signals encoding PUSCH and HARQ feedback may be received by a satellite from a UE device.

Included herein are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Figure 9:
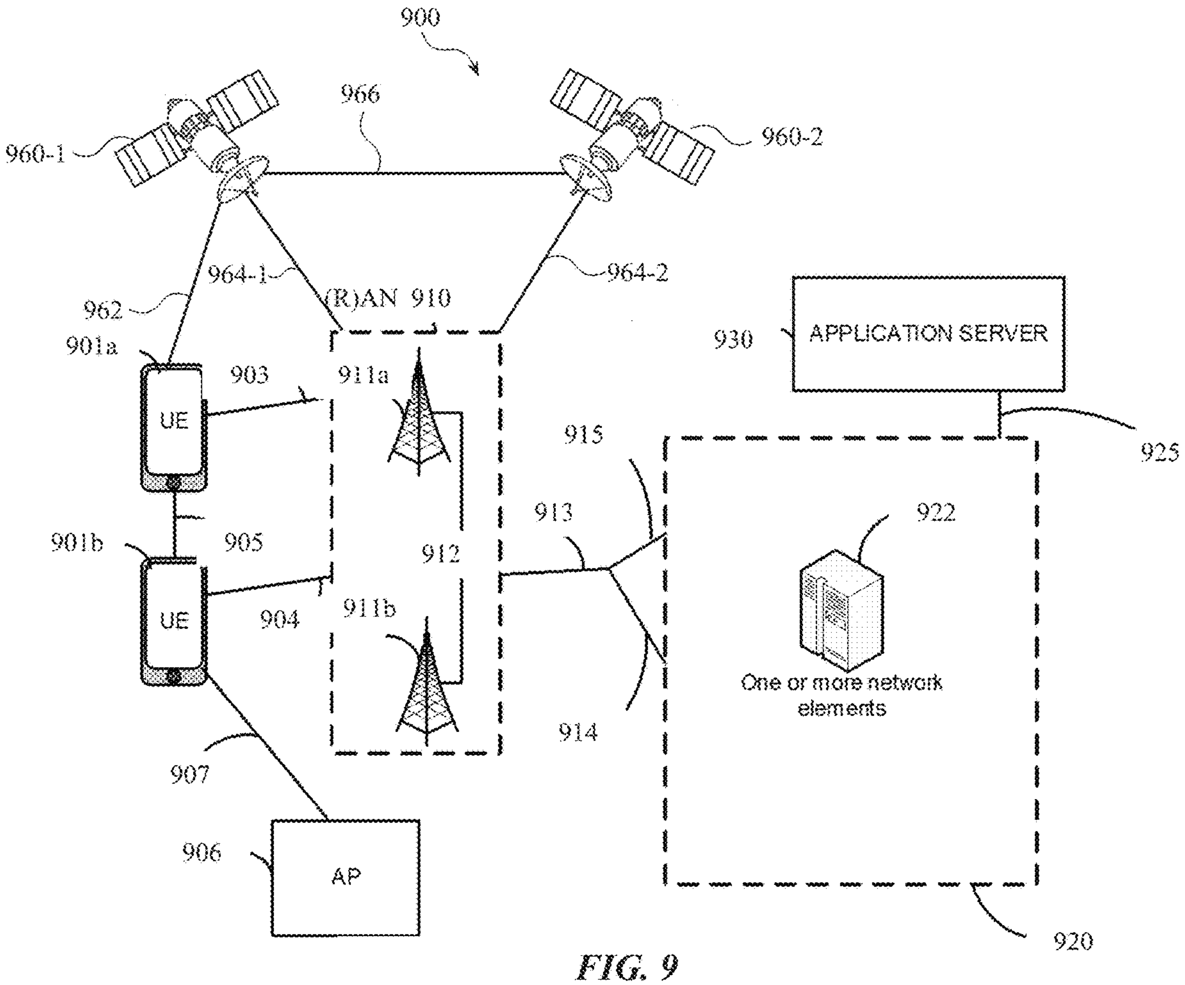
FIG. 9 illustrates an example communication network, in accordance with various aspects disclosed.

FIG. 9 illustrates an example architecture of a system 900 of a communication network, in accordance with various aspects. The following description is provided for an example system 900 that operates in conjunction with the LTE system standards and 5G or NR system standards as provided by 3GPP technical specifications. However, the example aspects are not limited in this regard and the described aspects may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 9, the system 900 includes UE 901*a* and UE 901*b* (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some aspects, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with a RAN 910. In aspects, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In aspects, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901*b* is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 702.11 protocol, wherein the AP 906 would comprise a wireless fidelity (Wi-Fi®) router. In this example, the AP 906 is shown to be connected to the Internet without connecting to the core network of the wireless system (described in further detail below). In various aspects, the UE 901*b*, RAN 910, and AP 906 may be configured to utilize LWA operation and/or LWIP operation. The LWA operation may involve the UE 901*b* in RRC_CONNECTED being configured by a RAN node 911*a-b* to utilize radio resources of LTE and WLAN. LWIP operation may involve the UE 901*b* using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911*a* and 911*b* (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As described below, in some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and also to implementation where the base station, RAN node 911, etc., is a non-terrestrial network node (e.g., satellite 160).

As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various aspects, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various aspects, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901*b* within a cell) may be performed at any of the RAN nodes 911 based on channel quality information fed back from any of the UEs 901. The downlink resource assignment information may be sent on the PDCCH used for (e.g., assigned to) each of the UEs 901.

The RAN 910 is shown to be communicatively coupled to a core network—in this aspect, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some aspects, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, example network 900 may include an NTN that may comprise one or more satellites 960-1 and 960-2 (collectively, "satellites 960"). Satellites 960 may be in communication with UEs 901 via service link or wireless interface 962 and/or RAN 910 via feeder links or wireless interfaces 964 (depicted individually as 964-1 and 964). In some implementations, satellite 960 may operate as a passive or transparent network relay node regarding communications between UEs 901 and the terrestrial network (e.g., RAN 910). In some implementations, satellite 960 may operate as an active or regenerative network node such that satellite 960 may operate as a base station to UEs 901 (e.g., as a gNB of RAN 910) regarding communications between UE 901 and RAN 910. In some implementations, satellites 960 may communicate with one another via a direct wireless interface (e.g., 966) or an indirect wireless interface (e.g., via RAN 910 using interfaces 964-1 and 964-2). Additionally, or alternatively, satellite 960 may include a GEO satellite, LEO satellite, or another type of satellite. Satellite 960 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and implementation, where the base station, RAN node 911, etc., is a non-terrestrial network node (e.g., satellite 960).

Figure 10:
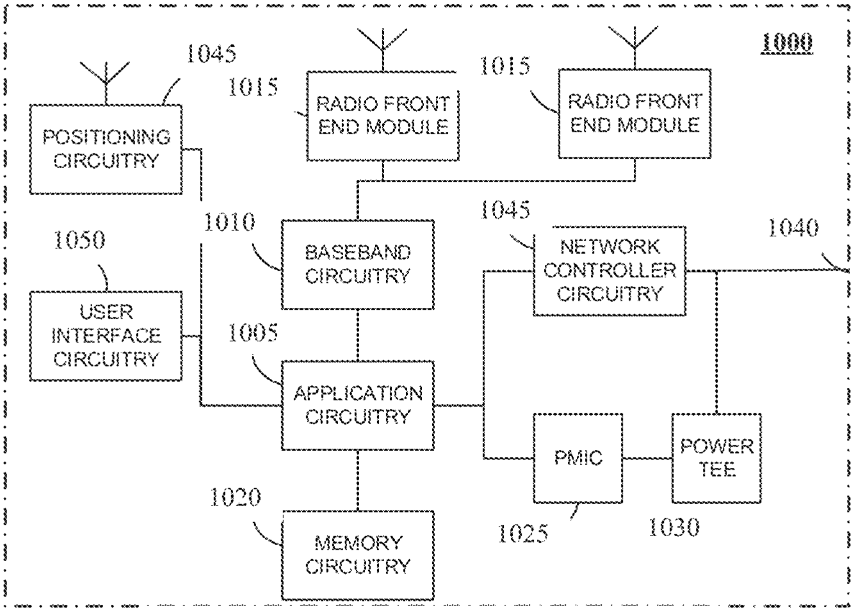
FIG. 10 illustrates an example of an infrastructure equipment device (e.g., BS, eNB, gNB), in accordance with various aspects disclosed.

FIG. 10 illustrates an example of infrastructure equipment 1000 in accordance with various aspects. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some aspects, the device 1000 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1005 may comprise, or may be, a special-purpose processor/controller to operate according to the various aspects herein. As examples, the processor(s) of application circuitry 1005 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1000 may not utilize application circuitry 1005, and instead may include a special-purpose processor/controller to process IP data received from an EPC or 5GC, for example.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an 12C interface, an SPI interface, point to point interfaces, and a power bus, among others.

Figure 11:
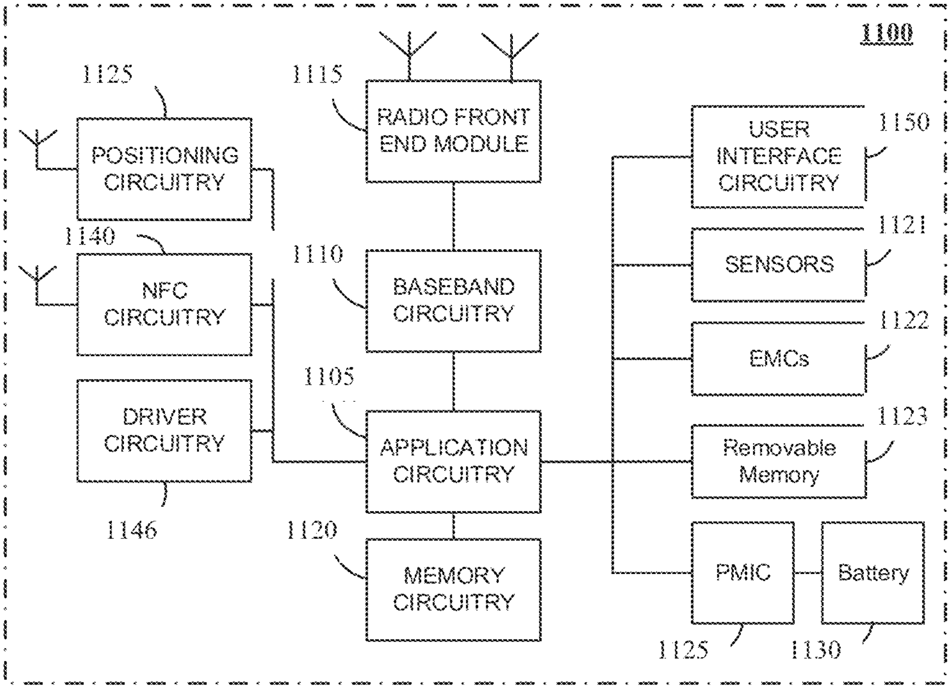
FIG. 11 illustrates an example of a user equipment device (referred to herein interchangeably as a "UE" or "UE device"), in accordance with various aspects disclosed.

FIG. 11 illustrates an example of a platform 1100 (or "device 1100") in accordance with various aspects. In aspects, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1105 may include a general or special purpose processor, such as an A-series processor (e.g., the A13 Bionic), available from Apple® Inc., Cupertino, CA or any other such processor. The processors of the application circuitry 1105 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package.

The baseband circuitry 1110 may be implemented, for example, as a solder-down substrate including one or more integrated circuits, a single packaged integrated circuit soldered to a main circuit board or a multi-chip module containing two or more integrated circuits.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is a user equipment (UE) device, including a processor configured to perform operations including receiving control information that indicates resources including one or more slots for communication of a physical downlink shared channel or a physical uplink shared channel (PDSCH/PUSCH) transmission that includes at least one PDSCH/PUSCH retransmission; identifying a slot group to which a selected one of the one or more slots belongs; configuring operation to receive the PDSCH transmission or to transmit the PUSCH transmission based on the resources; and in response to determining that a PDSCH/PUSCH retransmission of the PDSCH/PUSCH transmission is scheduled for a slot outside the identified slot group, configuring operation to refrain from receiving of the PDSCH retransmission or to refrain from transmitting the PUSCH retransmission, and provide hybrid automatic repetition request (HARQ) feedback based on PDSCH retransmissions scheduled for slots within the identified slot group, wherein the HARQ feedback is not based on PDSCH scheduled for slots outside the identified slot group.

Example 2 includes the subject matter of example 1, including or excluding optional elements, wherein each slot group includes a set of contiguous slots.

Example 3 includes the subject matter of example 1, including or excluding optional elements, wherein each slot group includes slots that are interleaved with slots from other groups.

Example 4 includes the subject matter of example 1, including or excluding optional elements, wherein the selected one of the one or more slots includes a first slot of the PDSCH/PUSCH.

Example 5 includes the subject matter of example 1, including or excluding optional elements, wherein the selected one of the one or more slots includes a first slot of a physical downlink control channel (PDCCH) associated with the PDSCH/PUSCH.

Example 5 is a method, including receiving control information that indicates resources including one or more slots for communication of a physical downlink shared channel (PDSCH) or a physical uplink shared channel (PUSCH) transmission that includes at least one PDSCH/PUSCH retransmission; identifying a slot group to which a selected one of the one or more slots belongs; configuring operation to receive the PDSCH transmission or to transmit the PUSCH transmission based on the resources; and in response to determining that a PDSCH/PUSCH retransmission of the PDSCH/PUSCH transmission is scheduled for a slot outside the identified slot group, configuring operation to refrain from receiving of the PDSCH retransmission or to refrain from transmitting the PUSCH retransmission, and provide hybrid automatic repetition request (HARQ) feedback based on PDSCH retransmissions scheduled for slots within the identified slot group, wherein the HARQ feedback is not based on PDSCH scheduled for slots outside the identified slot group.

Example 7 includes the subject matter of example 6, including or excluding optional elements, wherein each slot group includes a set of contiguous slots.

Example 8 includes the subject matter of example 6, including or excluding optional elements, wherein each slot group includes slots that are interleaved with slots from other groups.

Example 9 includes the subject matter of example 6, including or excluding optional elements, wherein the selected one of the one or more slots includes a first slot of the PDSCH/PUSCH.

Example 10 includes the subject matter of example 6, including or excluding optional elements, wherein the selected one of the one or more slots includes a first slot of a physical downlink control channel (PDCCH) associated with the PDSCH/PUSCH.

Example 11 is a base station, including a processor configured to perform operations including transmitting control information that indicates resources including one or more slots for communication of a physical downlink shared channel (PDSCH) or a physical uplink shared channel (PUSCH) transmission that includes at least one PDSCH/PUSCH retransmission; identifying a slot group to which a selected one of the one or more slots belongs; configuring operation to receive the PUSCH transmission or to transmit the PDSCH transmission based on the resources; and in response to determining that a PDSCH/PUSCH retransmission of the PDSCH/PUSCH transmission is scheduled for a slot outside the identified slot group, configuring operation to refrain from transmitting of the PDSCH retransmission or to refrain from receiving the PUSCH retransmission, and receive hybrid automatic repetition request (HARQ) feedback based on PDSCH retransmissions scheduled for slots within the identified slot group, wherein the HARQ feedback is not based on PDSCH scheduled for slots outside the identified slot group.

Example 12 includes the subject matter of example 11, including or excluding optional elements, wherein each slot group includes a set of contiguous slots.

Example 13 includes the subject matter of example 11, including or excluding optional elements, wherein each slot group includes slots that are interleaved with slots from other groups.

Example 14 includes the subject matter of example 11, including or excluding optional elements, wherein the selected one of the one or more slots includes a first slot of the PDSCH/PUSCH.

Example 15 includes the subject matter of example 11, including or excluding optional elements, wherein the selected one of the one or more slots includes a first slot of a physical downlink control channel (PDCCH) associated with the PDSCH/PUSCH.

Example 16 is a method, including transmitting control information that indicates resources including one or more slots for communication of a physical downlink shared channel (PDSCH) or a physical uplink shared channel (PUSCH) transmission that includes at least one PDSCH/PUSCH retransmission; identifying a slot group to which a selected one of the one or more slots belongs; configuring operation to receive the PUSCH transmission or to transmit the PDSCH transmission based on the resources; and in response to determining that a PDSCH/PUSCH retransmission of the PDSCH/PUSCH transmission is scheduled for a slot outside the identified slot group, configuring operation to refrain from transmitting of the PDSCH retransmission or to refrain from receiving the PUSCH retransmission, and receive hybrid automatic repetition request (HARQ) feedback based on PDSCH retransmissions scheduled for slots within the identified slot group, wherein the HARQ feedback is not based on PDSCH scheduled for slots outside the identified slot group.

Example 17 includes the subject matter of example 16, including or excluding optional elements, wherein each slot group includes a set of contiguous slots.

Example 18 includes the subject matter of example 16, including or excluding optional elements, wherein each slot group includes slots that are interleaved with slots from other groups.

Example 19 includes the subject matter of example 16, including or excluding optional elements, wherein the selected one of the one or more slots includes a first slot of the PDSCH/PUSCH.

Example 20 includes the subject matter of example 16, including or excluding optional elements, wherein the selected one of the one or more slots includes a first slot of a physical downlink control channel (PDCCH) associated with the PDSCH/PUSCH.

Example 21 is a user equipment (UE) device, including a processor configured to perform operations including receiving control information that indicates HARQ information associated with communication of a physical downlink shared channel (PDSCH) or a physical uplink shared channel (PUSCH) transmission that includes at least one PDSCH/PUSCH retransmission; determining, based on the control information, that HARQ feedback is disabled; determining a repetition number defining a number of retransmissions in the PDSCH/PUSCH based on information in a control information field that carries information relating to HARQ feedback when HARQ feedback is enabled; and configuring operation to receive the PDSCH transmission or to transmit the PUSCH transmission based on the HARQ information and the repetition number.

Example 22 includes the subject matter of example 21, including or excluding optional elements, wherein the control information field includes a field that carries redundancy version sequence information when HARQ feedback is enabled.

Example 23 includes the subject matter of example 21, including or excluding optional elements, wherein the control information field includes a field that carries a new data indicator when HARQ feedback is enabled.

Example 24 includes the subject matter of example 21, including or excluding optional elements, wherein the processor is configured to perform operations including determining a redundancy version sequence for the PDSCH/PUSCH based on a time domain resource allocation (TDRA) table index indicated in the control information.

Example 25 includes the subject matter of example 21, including or excluding optional elements, wherein the processor is configured to perform operations including determining a redundancy version sequence based on the information in the control field that carries information relating to HARQ feedback when HARQ feedback is enabled.

Example 26 includes the subject matter of example 25, including or excluding optional elements, wherein the processor is configure to perform operations including determining the redundancy version sequence based on a redundancy version sequence index indicated in the control field that carries information relating to HARQ feedback when HARQ feedback is enabled.

Example 27 is a method, including receiving control information that indicates HARQ information associated with communication of a physical downlink shared channel (PDSCH) or a physical uplink shared channel (PUSCH) transmission that includes at least one PDSCH/PUSCH retransmission; determining, based on the control information, that HARQ feedback is disabled; determining a repetition number defining a number of retransmissions in the PDSCH/PUSCH based on information in a control information field that carries information relating to HARQ feedback when HARQ feedback is enabled; and configuring operation to receive the PDSCH transmission or to transmit the PUSCH transmission based on the HARQ information and the repetition number.

Example 28 includes the subject matter of example 27, including or excluding optional elements, wherein the control information field includes a field that carries redundancy version sequence information when HARQ feedback is enabled.

Example 29 includes the subject matter of example 27, including or excluding optional elements, wherein the control information field includes a field that carries a new data indicator when HARQ feedback is enabled.

Example 30 includes the subject matter of example 27, including or excluding optional elements, further including determining a redundancy version sequence for the PDSCH/PUSCH based on a time domain resource allocation (TDRA) table index indicated in the control information.

Example 31 includes the subject matter of example 27, including or excluding optional elements, further including determining a redundancy version sequence based on the information in the control field that carries information relating to HARQ feedback when HARQ feedback is enabled.

Example 32 includes the subject matter of example 31, including or excluding optional elements, further including determining the redundancy version sequence based on a redundancy version sequence index indicated in the control field that carries information relating to HARQ feedback when HARQ feedback is enabled.

Example 33 is a base station, including a processor configured to perform operations including transmitting control information that indicates HARQ information associated with communication of a physical downlink shared channel (PDSCH) or a physical uplink shared channel (PUSCH) transmission that includes at least one PDSCH/PUSCH retransmission, wherein the control information further indicates that that HARQ feedback is disabled; encoding a repetition number defining a number of retransmissions in the PDSCH/PUSCH based on information in a control information field that carries information relating to HARQ feedback when HARQ feedback is enabled; transmitting the control information; and configuring operation to transmit the PDSCH transmission or to receive the PUSCH transmission based on the HARQ information and the repetition number.

Example 34 includes the subject matter of example 33, including or excluding optional elements, wherein the control information field includes a field that carries redundancy version sequence information when HARQ feedback is enabled.

Example 35 includes the subject matter of example 33, including or excluding optional elements, wherein the control information field includes a field that carries a new data indicator when HARQ feedback is enabled.

Example 36 includes the subject matter of example 33, including or excluding optional elements, wherein the processor is configured to perform operations including indicating a redundancy version sequence for the PDSCH/PUSCH based on a time domain resource allocation (TDRA) table index indicated in the control information.

Example 37 includes the subject matter of example 33, including or excluding optional elements, wherein the processor is configured to perform operations including indicating a redundancy version sequence based on the information in the control field that carries information relating to HARQ feedback when HARQ feedback is enabled.

Example 38 includes the subject matter of example 37, including or excluding optional elements, wherein the processor is configure to perform operations including indicating the redundancy version sequence based on a redundancy version sequence index indicated in the control field that carries information relating to HARQ feedback when HARQ feedback is enabled.

Example 39 is a method, including transmitting control information that indicates HARQ information associated with communication of a physical downlink shared channel (PDSCH) or a physical uplink shared channel (PUSCH) transmission that includes at least one PDSCH/PUSCH retransmission, wherein the control information further indicates that that HARQ feedback is disabled; encoding a repetition number defining a number of retransmissions in the PDSCH/PUSCH based on information in a control information field that carries information relating to HARQ feedback when HARQ feedback is enabled; transmitting the control information; and configuring operation to transmit the PDSCH transmission or to receive the PUSCH transmission based on the HARQ information and the repetition number.

Example 40 includes the subject matter of example 39, including or excluding optional elements, wherein the control information field includes a field that carries redundancy version sequence information when HARQ feedback is enabled.

Example 41 includes the subject matter of example 39, including or excluding optional elements, wherein the control information field includes a field that carries a new data indicator when HARQ feedback is enabled.

Example 42 includes the subject matter of example 39, including or excluding optional elements, further including indicating a redundancy version sequence for the PDSCH/PUSCH based on a time domain resource allocation (TDRA) table index indicated in the control information.

Example 43 includes the subject matter of example 39, including or excluding optional elements, further including indicating a redundancy version sequence based on the information in the control field that carries information relating to HARQ feedback when HARQ feedback is enabled.

Example 44 includes the subject matter of example 43, including or excluding optional elements, further including indicating the redundancy version sequence based on a redundancy version sequence index indicated in the control field that carries information relating to HARQ feedback when HARQ feedback is enabled.

Example 45 is a user equipment (UE) device, including a processor configured to perform operations including receiving control information that indicates resources including one or more slots for communication of a physical downlink shared channel (PDSCH) or a physical uplink shared channel (PUSCH) transmission that includes at least one PDSCH/PUSCH retransmission, wherein the one or more slots are discontinuous and each pair of consecutive slots in the one or more slots are separated by a corresponding time gap that includes one or more slots; and configuring operation to receive the PDSCH transmission or to transmit the PUSCH transmission based on the resources.

Example 46 includes the subject matter of example 45, including or excluding optional elements, wherein the processor is configured to perform operations including determining a set of gaps interleaved between the one or more slots based on a time domain resource allocation (TDRA) table index indicated by the control information.

Example 47 includes the subject matter of example 46, including or excluding optional elements, wherein the TDRA index identifies a row in a TDRA table that indicates a sequence of time gaps.

Example 48 includes the subject matter of example 47, including or excluding optional elements, wherein the row also indicates a repetition number indicating a number of retransmissions included in the PDSCH/PUSCH transmission.

Example 49 includes the subject matter of example 45, including or excluding optional elements, wherein each of the corresponding time gaps include a same number of slots.

Example 50 is a method, including receiving control information that indicates resources including one or more slots for communication of a physical downlink shared channel (PDSCH) or a physical uplink shared channel (PUSCH) transmission that includes at least one PDSCH/PUSCH retransmission, wherein the one or more slots are discontinuous and each pair of consecutive slots in the one or more slots are separated by a corresponding time gap that includes one or more slots; and configuring operation to receive the PDSCH transmission or to transmit the PUSCH transmission based on the resources.

Example 51 includes the subject matter of example 50, including or excluding optional elements, further including determining a set of gaps interleaved between the one or more slots based on a time domain resource allocation (TDRA) table index indicated by the control information.

Example 52 includes the subject matter of example 51, including or excluding optional elements, wherein the TDRA index identifies a row in a TDRA table that indicates a sequence of time gaps.

Example 53 includes the subject matter of example 52, including or excluding optional elements, wherein the row also indicates a repetition number indicating a number of retransmissions included in the PDSCH/PUSCH transmission.

Example 54 includes the subject matter of example 50, including or excluding optional elements, wherein each of the corresponding time gaps include a same number of slots.

Example 55 is a base station, including a processor configured to perform operations including transmitting control information that indicates resources including one or more slots for communication of a physical downlink shared channel (PDSCH) or a physical uplink shared channel (PUSCH) transmission that includes at least one PDSCH/PUSCH retransmission, wherein the one or more slots are discontinuous and each pair of consecutive slots in the one or more slots are separated by a corresponding time gap that includes one or more slots; and configuring operation to receive the PDSCH transmission or to transmit the PUSCH transmission based on the resources.

Example 56 includes the subject matter of example 55, including or excluding optional elements, wherein the processor is configured to perform operations including indicating a set of gaps interleaved between the one or more slots based on a time domain resource allocation (TDRA) table index indicated by the control information.

Example 57 includes the subject matter of example 56, including or excluding optional elements, wherein the TDRA index identifies a row in a TDRA table that indicates a sequence of time gaps.

Example 58 includes the subject matter of example 57, including or excluding optional elements, wherein the row also indicates a repetition number indicating a number of retransmissions included in the PDSCH/PUSCH transmission.

Example 59 includes the subject matter of example 55, including or excluding optional elements, wherein each of the corresponding time gaps include a same number of slots.

Example 60 is a method, including transmitting control information that indicates resources including one or more slots for communication of a physical downlink shared channel (PDSCH) or a physical uplink shared channel (PUSCH) transmission that includes at least one PDSCH/PUSCH retransmission, wherein the one or more slots are discontinuous and each pair of consecutive slots in the one or more slots are separated by a corresponding time gap that includes one or more slots; and configuring operation to receive the PDSCH transmission or to transmit the PUSCH transmission based on the resources.

Example 61 includes the subject matter of example 60, including or excluding optional elements, further including indicating a set of gaps interleaved between the one or more slots based on a time domain resource allocation (TDRA) table index indicated by the control information.

Example 62 includes the subject matter of example 61, including or excluding optional elements, wherein the TDRA index identifies a row in a TDRA table that indicates a sequence of time gaps.

Example 63 includes the subject matter of example 62, including or excluding optional elements, wherein the row also indicates a repetition number indicating a number of retransmissions included in the PDSCH/PUSCH transmission.

Example 64 includes the subject matter of example 60, including or excluding optional elements, wherein each of the corresponding time gaps include a same number of slots.

Example 65 is a user equipment (UE) device, including a processor configured to perform operations including selectively configuring operation of the UE device to apply limited buffer rate matching (LBRM) when the UE supports more than 16 HARQ processes.

Example 66 includes the subject matter of example 65, including or excluding optional elements, wherein the processor is configured to automatically configure operation of the UE device to apply LBRM when the UE supports more than 16 HARQ processes.

Example 67 includes the subject matter of example 65, including or excluding optional elements, wherein the processor is configured to selectively configure operation of the UE device to apply LBRM based on received configuration information when the UE device supports more than 16 HARQ processes.

Example 68 includes the subject matter of example 65, including or excluding optional elements, wherein the processor is configured to cause the UE device to transmit, to a base station, capability information that indicates a manner in which the UE device applies LBRM when the UE device supports more than 16 HARQ processes.

Example 69 includes the subject matter of example 65, including or excluding optional elements, wherein the processor is configured to configure a reduced size of a transport block (TB) when the UE device supports more than 16 HARQ processes.

Example 70 includes the subject matter of example 69, including or excluding optional elements, wherein the reduced size is greater than ⅔ of a TB size configured when the UE device supports less than 16 HARQ processes.

Example 71 is a method, including, with a user equipment (UE) device selectively configuring operation of the UE device to apply limited buffer rate matching (LBRM) when the UE device supports more than 16 HARQ processes.

Example 72 includes the subject matter of example 71, including or excluding optional elements, further including automatically configuring operation of the UE device to apply LBRM when the UE device supports more than 16 HARQ processes.

Example 73 includes the subject matter of example 71, including or excluding optional elements, further including selectively configuring operation of the UE device to apply LBRM based on received configuration information when the UE device supports more than 16 HARQ processes.

Example 74 includes the subject matter of example 71, including or excluding optional elements, further including controlling the UE device to transmit, to a base station, capability information that indicates a manner in which the UE device applies LBRM when the UE device supports more than 16 HARQ processes.

Example 75 includes the subject matter of example 71, including or excluding optional elements, further including configuring a reduced size of a transport block (TB) when the UE device supports more than 16 HARQ processes.

Example 76 includes the subject matter of example 75, including or excluding optional elements, wherein the reduced size is greater than ⅔ of a TB size configured when the UE device supports less than 16 HARQ processes.

Example 77 is a base station, including a processor configured to perform operations including selectively configuring operation of a user equipment (UE) device to apply limited buffer rate matching (LBRM) when the UE device supports more than 16 HARQ processes.

Example 78 includes the subject matter of example 77, including or excluding optional elements, wherein the processor is configured to automatically apply LBRM when the UE device supports more than 16 HARQ processes.

Example 79 includes the subject matter of example 77, including or excluding optional elements, wherein the processor is configured to communicate LBRM configuration information to the UE device to selectively configure operation of the UE device to apply LBRM when the UE device supports more than 16 HARQ processes.

Example 80 includes the subject matter of example 77, including or excluding optional elements, wherein the processor is configured to receive, from the UE device, capability information that indicates a manner in which the UE device applies LBRM when the UE device supports more than 16 HARQ processes.

Example 81 includes the subject matter of example 77, including or excluding optional elements, wherein the processor is configured to configure a reduced size of a transport block (TB) when the UE device supports more than 16 HARQ processes.

Example 82 includes the subject matter of example 81, including or excluding optional elements, wherein the reduced size is greater than ⅔ of a TB size configured when the UE supports less than 16 HARQ processes.

Example 83 is a method, including selectively configuring operation of a user equipment (UE) device to apply limited buffer rate matching (LBRM) when the UE device supports more than 16 HARQ processes.

Example 84 includes the subject matter of example 83, including or excluding optional elements, further including automatically applying LBRM when the UE device supports more than 16 HARQ processes.

Example 85 includes the subject matter of example 83, including or excluding optional elements, further including communicating LBRM configuration information to the UE device to selectively configure operation of the UE device to apply LBRM when the UE device supports more than 16 HARQ processes.

Example 86 includes the subject matter of example 83, including or excluding optional elements, further including receiving, from the UE device, capability information that indicates a manner in which the UE device applies LBRM when the UE device supports more than 16 HARQ processes.

Example 87 includes the subject matter of example 83, including or excluding optional elements, further including configuring a reduced size of a transport block (TB) when the UE device supports more than 16 HARQ processes.

Example 88 includes the subject matter of example 87, including or excluding optional elements, wherein the reduced size is greater than ⅔ of a TB size configured when the UE supports less than 16 HARQ processes.

Example 89 is a baseband processor of a user equipment (UE) device, configured to perform operations including receiving control information that indicates resources including one or more slots for communication of a physical downlink shared channel or a physical uplink shared channel (PDSCH/PUSCH) transmission that includes at least one PDSCH/PUSCH retransmission; identifying a slot group to which a selected one of the one or more slots belongs; configuring operation to receive the PDSCH transmission or to transmit the PUSCH transmission based on the resources; and in response to determining that a PDSCH/PUSCH retransmission of the PDSCH/PUSCH transmission is scheduled for a slot outside the identified slot group, configuring operation to refrain from receiving of the PDSCH retransmission or to refrain from transmitting the PUSCH retransmission, and provide hybrid automatic repetition request (HARQ) feedback based on PDSCH retransmissions scheduled for slots within the identified slot group, wherein the HARQ feedback is not based on PDSCH scheduled for slots outside the identified slot group.

Example 90 includes the subject matter of example 89, including or excluding optional elements, wherein each slot group includes a set of contiguous slots.

Example 91 includes the subject matter of example 89, including or excluding optional elements, wherein each slot group includes slots that are interleaved with slots from other groups.

Example 92 includes the subject matter of example 89, including or excluding optional elements, wherein the selected one of the one or more slots includes a first slot of the PDSCH/PUSCH.

Example 93 includes the subject matter of example 89, including or excluding optional elements, wherein the selected one of the one or more slots includes a first slot of a physical downlink control channel (PDCCH) associated with the PDSCH/PUSCH.

Example 94 is a baseband processor of user equipment (UE) device, configured to perform operations including receiving control information that indicates HARQ information associated with communication of a physical downlink shared channel (PDSCH) or a physical uplink shared channel (PUSCH) transmission that includes at least one PDSCH/PUSCH retransmission; determining, based on the control information, that HARQ feedback is disabled; determining a repetition number defining a number of retransmissions in the PDSCH/PUSCH based on information in a control information field that carries information relating to HARQ feedback when HARQ feedback is enabled; and configuring operation to receive the PDSCH transmission or to transmit the PUSCH transmission based on the HARQ information and the repetition number.

Example 95 includes the subject matter of example 94, including or excluding optional elements, wherein the control information field includes a field that carries redundancy version sequence information when HARQ feedback is enabled.

Example 96 includes the subject matter of example 94, including or excluding optional elements, wherein the control information field includes a field that carries a new data indicator when HARQ feedback is enabled.

Example 97 includes the subject matter of example 94, including or excluding optional elements, wherein the baseband processor is configured to perform operations including determining a redundancy version sequence for the PDSCH/PUSCH based on a time domain resource allocation (TDRA) table index indicated in the control information.

Example 98 includes the subject matter of example 94, including or excluding optional elements, wherein the baseband processor is configured to perform operations including determining a redundancy version sequence based on the information in the control field that carries information relating to HARQ feedback when HARQ feedback is enabled.

Example 99 includes the subject matter of example 98, including or excluding optional elements, wherein the baseband processor is configure to perform operations including determining the redundancy version sequence based on a redundancy version sequence index indicated in the control field that carries information relating to HARQ feedback when HARQ feedback is enabled.

Example 100 is a baseband processor of a user equipment (UE) device, configured to perform operations including receiving control information that indicates resources including one or more slots for communication of a physical downlink shared channel (PDSCH) or a physical uplink shared channel (PUSCH) transmission that includes at least one PDSCH/PUSCH retransmission, wherein the one or more slots are discontinuous and each pair of consecutive slots in the one or more slots are separated by a corresponding time gap that includes one or more slots; and configuring operation to receive the PDSCH transmission or to transmit the PUSCH transmission based on the resources.

Example 101 includes the subject matter of example 100, including or excluding optional elements, wherein the baseband processor is configured to perform operations including determining a set of gaps interleaved between the one or more slots based on a time domain resource allocation (TDRA) table index indicated by the control information.

Example 102 includes the subject matter of example 101, including or excluding optional elements, wherein the TDRA index identifies a row in a TDRA table that indicates a sequence of time gaps.

Example 103 includes the subject matter of example 102, including or excluding optional elements, wherein the row also indicates a repetition number indicating a number of retransmissions included in the PDSCH/PUSCH transmission.

Example 104 includes the subject matter of example 100, including or excluding optional elements, wherein each of the corresponding time gaps include a same number of slots.

Example 105 is a baseband processor of a user equipment (UE) device, configured to perform operations including selectively configuring operation of the UE device to apply limited buffer rate matching (LBRM) when the UE supports more than 16 HARQ processes.

Example 106 includes the subject matter of example 105, including or excluding optional elements, wherein the baseband processor is configured to automatically configure operation of the UE device to apply LBRM when the UE supports more than 16 HARQ processes.

Example 107 includes the subject matter of example 105, including or excluding optional elements, wherein the baseband processor is configured to selectively configure operation of the UE device to apply LBRM based on received configuration information when the UE device supports more than 16 HARQ processes.

Example 108 includes the subject matter of example 105, including or excluding optional elements, wherein the baseband processor is configured to cause the UE device to transmit, to a base station, capability information that indicates a manner in which the UE device applies LBRM when the UE device supports more than 16 HARQ processes.

Example 109 includes the subject matter of example 105, including or excluding optional elements, wherein the baseband processor is configured to configure a reduced size of a transport block (TB) when the UE device supports more than 16 HARQ processes.

Example 110 includes the subject matter of example 109, including or excluding optional elements, wherein the reduced size is greater than ⅔ of a TB size configured when the UE device supports less than 16 HARQ processes.

Example 111 includes the subject matter of example 1, including or omitting optional elements, wherein the control information or PDSCH is transmitted by a satellite.

Example 112 includes the subject matter of example 1, including or omitting optional elements, wherein the PUSCH or HARQ feedback is transmitted to a satellite.

Example 113 includes the subject matter of example 11, including or omitting optional elements, wherein the control information or PDSCH is transmitted by a satellite.

Example 114 includes the subject matter of example 11, including or omitting optional elements, wherein the PUSCH or HARQ feedback is transmitted to a satellite.

Example 115 includes the subject matter of example 21, including or omitting optional elements, wherein the control information or PDSCH is transmitted by a satellite.

Example 116 includes the subject matter of example 21, including or omitting optional elements, wherein the PUSCH is transmitted to a satellite.

Example 117 includes the subject matter of example 33, including or omitting optional elements, wherein the control information or PDSCH is transmitted by a satellite.

Example 118 includes the subject matter of example 33, including or omitting optional elements, wherein the PUSCH is transmitted to a satellite.

Example 119 includes the subject matter of example 55, including or omitting optional elements, wherein the control information or PDSCH is transmitted by a satellite.

Example 120 includes the subject matter of example 55, including or omitting optional elements, wherein the PUSCH is transmitted to a satellite.

Example 121 includes the subject matter of example 89, including or omitting optional elements, wherein the control information or PDSCH is transmitted by a satellite.

Example 122 includes the subject matter of example 89, including or omitting optional elements, wherein the PUSCH or HARQ feedback is transmitted to a satellite.

Example 123 includes the subject matter of example 94, including or omitting optional elements, wherein the control information or PDSCH is transmitted by a satellite.

Example 124 includes the subject matter of example 94, including or omitting optional elements, wherein the PUSCH is transmitted to a satellite.

Example 125 includes the subject matter of example 100, including or omitting optional elements, wherein the control information or PDSCH is transmitted by a satellite.

Example 126 includes the subject matter of example 100, including or omitting optional elements, wherein the PUSCH is transmitted to a satellite.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A base station, comprising memory coupled to a processor, the processor configured to:

transmit control information that indicates HARQ information associated with communication of a physical downlink shared channel (PDSCH) transmission or a physical uplink shared channel (PUSCH) transmission that includes at least one PDSCH/PUSCH retransmission, wherein the control information further indicates that HARQ feedback is disabled, the control information including a new data indicator field;

when HARQ feedback is disabled, encode a time domain resource allocation (TDRA) table index in the new data indicator field, wherein the TDRA index is mapped to a set of resources including one or more slots for communication of a PDSCH or PUSCH transmission that includes at least one retransmission, a particular number of retransmissions for the PDSCH/PUSCH, and a set of time gaps that indicates a number of slots between successive PDSCH/PUSCH transmissions including retransmissions; and transmit the PDSCH transmission or receive the PUSCH transmission based on the HARQ information and the set of resources, the particular number of retransmissions, and the set of time gaps.

2. The base station of claim 1, wherein the TDRA table includes a repetition index that is mapped to the particular number of retransmissions by prior signaling.

3. The base station of claim 1, wherein each of the time gaps indicates a same number of slots.

4. The base station of claim 1, wherein the TDRA table index identifies a row in a TDRA table that indicates a sequence of time gaps.

5. A method, comprising:

receiving control information that indicates HARQ information associated with communication of a physical downlink shared channel (PDSCH) transmission or a physical uplink shared channel (PUSCH) transmission that includes at least one PDSCH/PUSCH retransmission, wherein the control information includes a new data indicator field;

determining, based on the control information, that HARQ feedback is disabled;

when HARQ feedback is disabled, identifying a time domain resource allocation (TDRA) table index in the new data indicator field, wherein the TDRA index is mapped to a set of resources including one or more slots for communication of a PDSCH or PUSCH transmission that includes at least one retransmission, a particular number of retransmissions for the PDSCH/PUSCH, and a set of time gaps that indicates a number of slots between successive PDSCH/PUSCH transmissions including retransmissions; and receiving the PDSCH transmission or transmitting the PUSCH transmission based on the HARQ information and the set of resources, the particular number of retransmissions, and the set of time gaps.

6. The method of claim 5, wherein the TDRA table includes a repetition index that is mapped to the particular number of retransmissions by prior signaling.

7. The method of claim 5, wherein the set of time gaps comprises a single time gap value indicating that each of the time gaps comprises a same number of slots.

8. A baseband processor, configured to perform operations, the operations comprising:

receiving control information that indicates HARQ information associated with communication of a physical downlink shared channel (PDSCH) transmission or a physical uplink shared channel (PUSCH) transmission that includes at least one PDSCH/PUSCH retransmission, wherein the control information includes a new data indicator field;

determining, based on the control information, that HARQ feedback is disabled;

when HARQ feedback is disabled, identifying a time domain resource allocation (TDRA) table index in the new data indicator field, wherein the TDRA index is mapped to a set of resources including one or more slots for communication of a PDSCH or PUSCH that includes at least one retransmission, a particular number of retransmissions for the PDSCH/PUSCH, and a set of time gaps that indicates a number of slots between successive PDSCH/PUSCH transmissions including retransmissions; and receiving the PDSCH transmission or transmitting the PUSCH transmission based on the HARQ information and set of resources, the particular number of retransmissions, and the set of time gaps.

9. The baseband processor of claim 8, wherein the TDRA table includes a repetition index that is mapped to the particular number of retransmissions by prior signaling.

10. The baseband processor of claim 8, wherein the set of time gaps comprises a single time gap value indicating that each of the time gaps comprises a same number of slots.

* * * * *